United States Patent
Lee et al.

(10) Patent No.: US 8,702,363 B2
(45) Date of Patent: Apr. 22, 2014

(54) LOCK NUT AND A FASTENING UNIT COMPRISING THE SAME

(76) Inventors: Yong Gook Lee, Ulsan (KR); Jin Koh Kim, Gyeonggi-do (KR)

( * ) Notice: Subject to any disclaimer, the term of this patent is extended or adjusted under 35 U.S.C. 154(b) by 0 days.

(21) Appl. No.: 13/699,723

(22) PCT Filed: May 23, 2011

(86) PCT No.: PCT/KR2011/003766
§ 371 (c)(1),
(2), (4) Date: Nov. 24, 2012

(87) PCT Pub. No.: WO2011/149232
PCT Pub. Date: Dec. 1, 2011

(65) Prior Publication Data
US 2013/0064624 A1    Mar. 14, 2013

(30) Foreign Application Priority Data

May 24, 2010    (KR) .................. 10-2010-0048146

(51) Int. Cl.
*F16B 39/12*    (2006.01)

(52) U.S. Cl.
USPC .......................................... 411/223; 411/432

(58) Field of Classification Search
USPC ......... 411/208, 209, 223, 383, 427, 432, 533, 411/534, 541
See application file for complete search history.

(56) References Cited

U.S. PATENT DOCUMENTS

| | | | |
|---|---|---|---|
| 1,272,763 A * | 7/1918 | Baughn .......................... | 411/223 |
| 1,329,814 A * | 2/1920 | Suhr .............................. | 411/223 |
| 3,329,190 A * | 7/1967 | Oldenkott ..................... | 411/136 |
| 3,417,802 A * | 12/1968 | Oldenkott ..................... | 411/134 |
| 4,940,377 A | 7/1990 | Reynolds | |
| 5,190,423 A * | 3/1993 | Ewing ........................... | 411/134 |
| 5,203,656 A * | 4/1993 | McKinlay ..................... | 411/149 |
| 5,626,449 A * | 5/1997 | McKinlay ..................... | 411/149 |
| 6,517,301 B2 * | 2/2003 | Hartmann et al. ............ | 411/136 |

(Continued)

FOREIGN PATENT DOCUMENTS

| | | |
|---|---|---|
| JP | 09-137815 | 5/1997 |
| JP | 2001-082433 | 3/2001 |
| JP | P4511540 | 3/2007 |
| KR | 20-0415224 | 4/2006 |

OTHER PUBLICATIONS

International Search Report for PCT/KR2011/003766 Mailed on Feb. 6, 2012.

*Primary Examiner* — Roberta Delisle
(74) *Attorney, Agent, or Firm* — AKC Patents; Aliki K. Collins

(57) ABSTRACT

The present invention relates to a lock nut which is fastened between a bolt and a nut and prevents the bolt and nut from loosening, comprising: a nut body having a fastening hole for fastening onto the bolt; a pair of first projecting parts which are formed projecting from one of the surfaces of the nut body and form a first slot having a first orientation such that the nut body can deform resiliently when the bolt and the nut are fastened; and a pair of second projecting parts which are formed projecting from the other surface of the nut body and form a second slot having a second orientation different from the first orientation, and the invention relates to a fastening unit comprising the lock nut; and provided is a bolt-and-nut loosening prevention structure having an improved loosening-prevention function.

9 Claims, 3 Drawing Sheets

(56) References Cited

U.S. PATENT DOCUMENTS

| | | | |
|---|---|---|---|
| 6,896,465 B2 * | 5/2005 | Andersson | 411/533 |
| 7,128,511 B2 * | 10/2006 | Hewgill | 411/149 |
| 2007/0128003 A1 * | 6/2007 | Shiu | 411/533 |

* cited by examiner

LOCK NUT AND A FASTENING UNIT COMPRISING THE SAME

RELATED APPLICATIONS

This application is a 371 application of International Application No. PCT/KR2011/003766, filed May 23, 2011, which in turn claims priority from Korean Patent Application No. 10-2010-0048146, filed May 24, 2010, each of which is incorporated herein by reference in its entirety.

CROSS-REFERENCE TO RELATED APPLICATION

This application claims the benefit of Korean Patent Application No. 2010-0048146, filed on May 24, 2010 in the Korean Intellectual Property Office, the disclosure of which is incorporated herein by reference.

FIELD OF INVENTION

The present disclosure relates to a lock nut to prevent a nut from loosing from a bolt and a fastening unit including the lock nut.

BACKGROUND

A bolt-nut unit is widely employed as a fastener in the machinery. In such a unit, a bolt and nut are threaded to each other to fasten objects. The fastened objects using the bolt and nut, however, may receive vibrations and/or shocks for a long time, so that the nut may loose from the bolt.

One general approach to prevent such loosing is to use a spring washer. The spring washer is a coil-shaped washer having a discontinuous cut portion and a twisted structure. The spring washer is elastically deformed when fastened between a bolt and nut with the nut being tightly threaded onto the bolt. Such elastic deformation of the spring washer may cause an elastic restoring force in a direction so as to increase a friction force between threads of the bolt and nut. Thus, the nut may be prevented from loosing from the bolt.

In addition to the spring washer, there have been employed a variety of other loosing prevention mechanisms to prevent the nut from loosing from the bolt.

SUMMARY OF INVENTION

The present disclosure conceived with consideration of the foregoing provides a loosing prevention structure to prevent a nut from loosing from a bolt with an improved degree using a different structure from those in the conventional art.

Moreover, the present disclosure provides a loosing prevention structure to prevent a nut from loosing from a bolt, which is simply manufactured and reusable semi-permanently.

In accordance with a first aspect of the present disclosure, there is provided a lock nut disposed between a bolt and nut to prevent the nut from loosing from the bolt, comprising: a nut body having a fastening hole formed therein; a pair of first protrusions formed on a top face of the nut body, the pair of first protrusions forming a first slot therebetween in a first direction, the first slot allowing an elastic deformation of the nut body; and a pair of second protrusions formed on a bottom face of the nut body, the pair of second protrusions forming a second slot therebetween in a second direction different from the first direction, the second slot allowing an elastic deformation of the nut body.

In one embodiment, the first and second directions may intersect with each other by an angle 90°.

In one embodiment, a sum of a height of the nut body and a height of the first protrusions and a height of the second protrusions may be 3 to 5 times larger than a pitch of the bolt. The height of the first protrusions and/or the height of the second protrusions may be equal to the pitch of the bolt.

In accordance with a second aspect of the present disclosure, there is provided a fastening unit comprising: a bolt; a nut fastened to the bolt so as to fasten objects; and the above-mentioned lock nut disposed between the bolt and nut to prevent the nut from loosing from the bolt.

In one embodiment, the lock nut may be fastened to the bolt while disposed between the objects and the nut, and the first and second protrusions of the lock nut may support the objects and the nut respectively.

In accordance with the present disclosure may have following advantages. It should be appreciated that the present disclosure may have not only following advantages but also other advantages and thus a scope of the present disclosure may not limited to the following advantages.

According to the present disclosure, the loosing prevention degree to prevent the nut from loosing from the bolt may be improved by means of the structure of the lock nut having the first and second slots formed respectively on the top and bottom face thereof, the first and second slots being extending in different directions from each other.

Moreover, the lock nut according to the present disclosure may be simply separated/fastened from/to the bolt. The lock nut may have superior workability and may be manufactured using a simple process.

Further, the lock nut according to the present disclosure may not be permanently-deformed structure and thus may be reusable semi-permanently.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTIONS OF EMBODIMENTS

These detailed descriptions may include exemplary embodiments in an example manner with respect to structures and/or functions and thus a scope of the present disclosure should not be construed to be limited to such embodiments. In other words, the present disclosure may be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims, and a scope of the present disclosure may include all equivalents to embody a spirit and idea of the present disclosure.

The terminology used in the present disclosure is for the purpose of describing particular embodiments only and is not intended to limit the disclosure. For example, the terminology used in the present disclosure may be construed as follows.

As used in the disclosure and the appended claims, the singular forms "a", "an" and "the" are intended to include the plural forms as well, unless context clearly indicates otherwise. It will be further understood that the terms "comprise" and/or "comprising and/or "include" and/or "including" and/or "have" and/or "having"" when used in this specification, specify the presence of stated features, integers, steps, operations, elements, and/or components, but do not preclude the presence or addition of one or more other features, integers, steps, operations, elements, components, and/or groups thereof.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Below, a lock nut and a fastening unit including the same in accordance with the present disclosure may be in details described with reference to the drawings.

Figure 1:
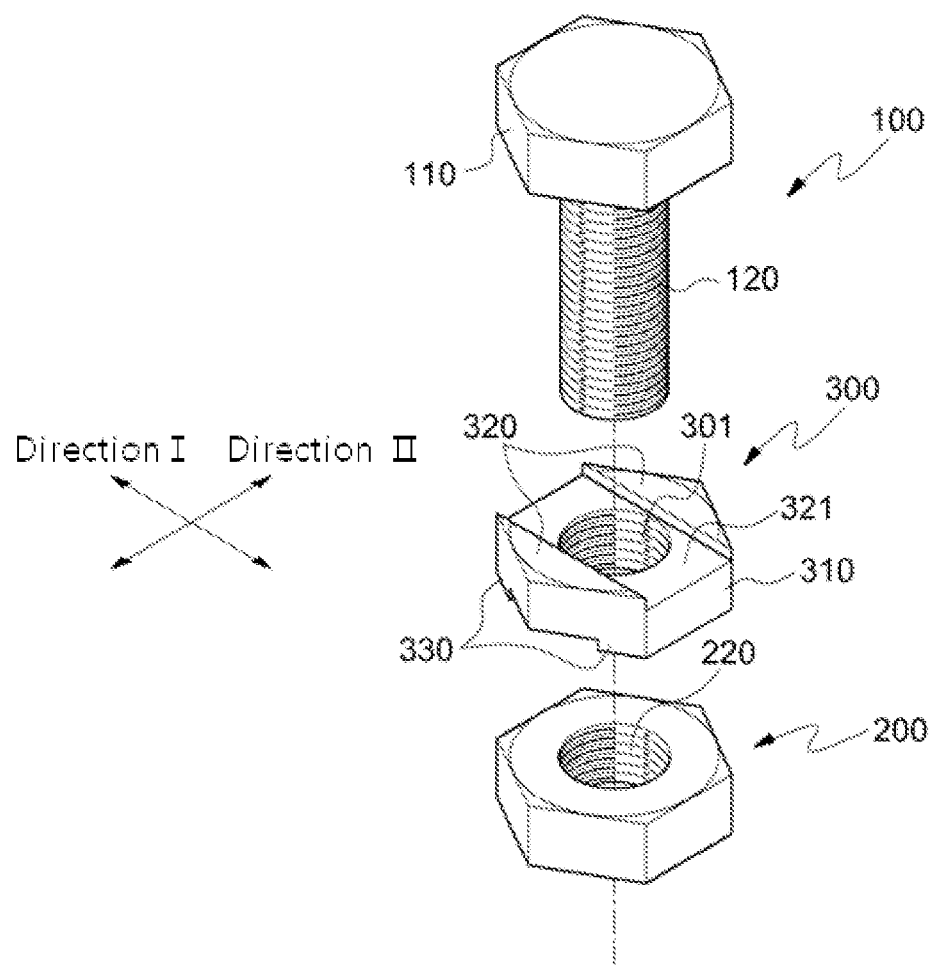
FIG. 1 is a perspective view of a lock nut and a fastening unit including the same in accordance with one embodiment of the present disclosure.
Figure 2:
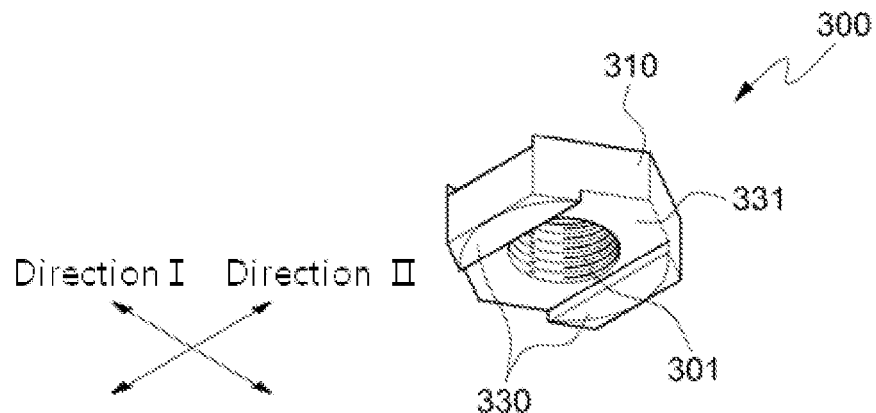
FIG. 2 is a perspective view of the lock nut of FIG. 1 when viewed at a bottom thereof.

FIG. 1 is a perspective view of a lock nut and a fastening unit including the same in accordance with one embodiment of the present disclosure. FIG. 2 is a perspective view of the lock nut of FIG. 1 when viewed at a bottom thereof.

With reference to FIG. 1, the fastening unit may include a bolt 100, nut 200 and lock nut 300.

The bolt 100 may include a head 110 and a thread portion 120 having a thread formed therein. The nut 200 may be fastened to the bolt 100 so as to fasten objects 10 (11, 12) to be fastened (refer to FIG. 3). For such a fastening, the nut 200 may have a screw hole 220 at which a thread is formed. In turn, the thread portion 120 of the bolt 100 may be inserted/threaded into the screw hole 220 of the nut 200.

The lock nut 300 may be disposed between the bolt 100 and the nut 200 to prevent the nut 200 from loosing from the bolt 100. Where it is necessary to move the objects, the lock nut 300 may be disposed between the nut 200 and another nut.

With reference to FIG. 1 and FIG. 2, the lock nut 300 may include a nut body 310, first protrusions 320, and second protrusions 330.

The nut body 310 may have a fastening hole 301 formed therein, through which the lock nut 300 may be fastened to the bolt 100. At the fastening hole 301, a thread is formed. In turn, the thread portion 120 of the bolt 100 may be inserted/threaded into the fastening hole 301 of the nut body 310.

A pair of the first protrusions 320 may be formed on one face (a top face in FIG. 1 and FIG. 2) of the nut body 310, the pair of first protrusions 320 forming a first slot 321 therebetween in a first direction (direction I). The first direction (direction I) means any direction along a horizontal face of the nut body 310. With reference to FIG. 1, a pair of the first protrusions 320 may be formed on the top face of the nut body 310 at both sides respectively while forming the first slot 321 therebetween. In other words, the nut body 310 and the first protrusions 320 forms resultant stepped structures at two sides respectively and the first slot 321 resulting from such stepped structures allows elastic deformation of the nut body 310 when the nut 200 is fastened to the bolt 100.

A pair of the second protrusions 330 may be formed on the other face (a bottom face in FIG. 1 and FIG. 2) of the nut body 310, the pair of the second protrusions 330 forming a second slot 331 therebetween in a second direction (direction II). The second direction (direction II) means any direction along a horizontal face of the nut body 310, different from the first direction (direction I). With reference to FIG. 2, a pair of the second protrusions 330 may be formed on the bottom face of the nut body 310 at both sides respectively while forming the second slot 331 therebetween. In other words, the nut body 310 and the second protrusions 330 forms resultant stepped structures at two sides respectively and the second slot 331 resulting from such stepped structures allows elastic deformation of the nut body 310 when the nut 200 is fastened to the bolt 100.

The first direction (direction I) and second direction (direction II) may intersect with each other at a center of the nut body 310 by a given intersection angle. In this embodiment, by way of example and no-limitation, the intersection angle is equal to 90°. This intersection angle of 90° is most advantageous in that the elastic deformation of the nut body 310 may be achieved at a maximum level. This is only one example but rather the intersection angle may vary.

It is preferable that a sum of a height of the nut body 310 and a height of the first protrusions 320 and a height of the second protrusions 330 may be 3 to 5 times larger than a pitch of the bolt 100 and the height of the first protrusions 320 and/or the height of the second protrusions 330 may be equal to the pitch of the bolt 100.

The lock nut 300 may be manufactured by pressing, etching or the like both faces of a conventional nut so as to form the first and second slots (321,331). Such protrusions (320, 330) may be additionally formed on both faces of a conventional nut.

Figure 3:
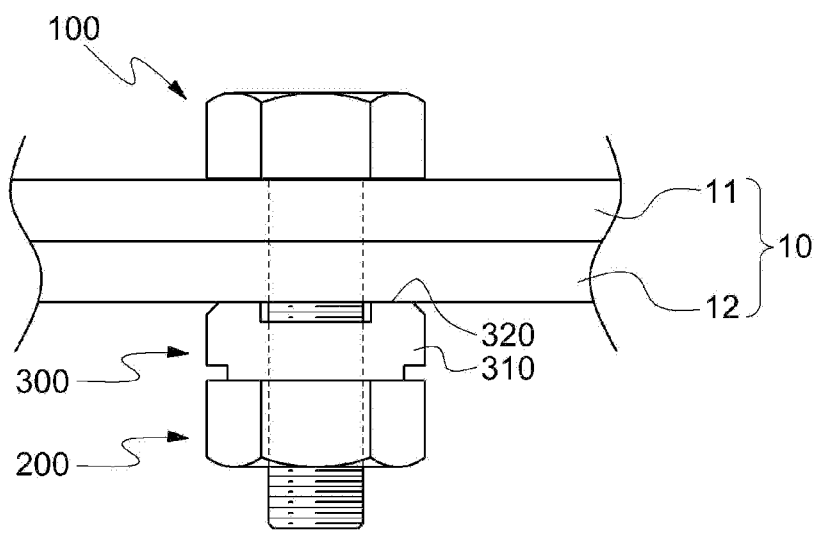
FIG. 3 is an elevation view to illustrate a process to fasten objects using the fastening unit of FIG. 1.
Figure 4:
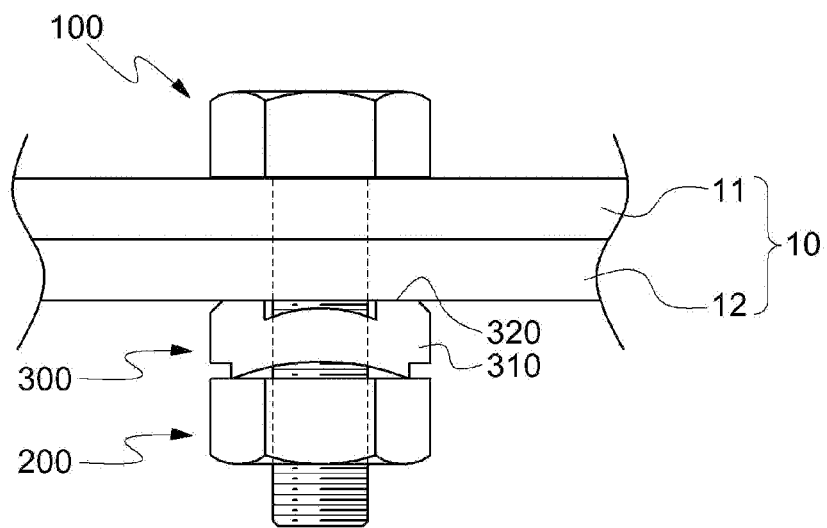
FIG. 4 is an elevation view of a state in which fastening of the nut to the bolt is completed, thereby the lock nut being elastically deformed.

FIG. 3 is an elevation view to illustrate a process to fasten objects using the fastening unit of FIG. 1. FIG. 4 is an elevation view of a state in which fastening of the nut to the bolt is completed, thereby the lock nut being elastically deformed.

FIG. 3 and FIG. 4 illustrate a process to fasten first and second members 11 and 12 as the objects 10 using the fastening unit. The thread portion 120 of the bolt 100 passes through through-holes formed at the first and second members 11 and 12 respectively while the lock nut 300 and the nut 200 in this order are threaded onto the thread portion 120 of the bolt 100 at an opposite side to the head 110 of the bolt 100. That is, the lock nut 300 is fastened to the bolt 100 while disposed between the objects 10 and the nut 200. In this manner, the first and second protrusions 320 and 330 of the lock nut 300 may support the objects 10 and the nut 200 respectively.

As an example, when the head 110 of the bolt 100 supports the first member 11, the first protrusions 320 of the lock nut 300 support the second member 12 and the second protrusions 330 of the lock nut 300 support the nut 200.

When the nut 200 is completely fastened to the bolt 100 via a pressure-threading operation, a stress along an axial direction of the bolt 100 may be applied to the first protrusions 320, resulting in elastic deformation of the nut body 310 as shown in FIG. 4. It may be noted that a degree of the deformation of the nut body 310 is shown as exaggerated in FIG. 4 for better understanding.

Such elastic deformation of the nut body 310 may entail elastic restoring force of the nut body 310, which in turn transfers to the bolt 100 and nut 200. Thus, the transfer force may increase a friction force between the threads of the bolt 100 and nut 200.

Figure 5:
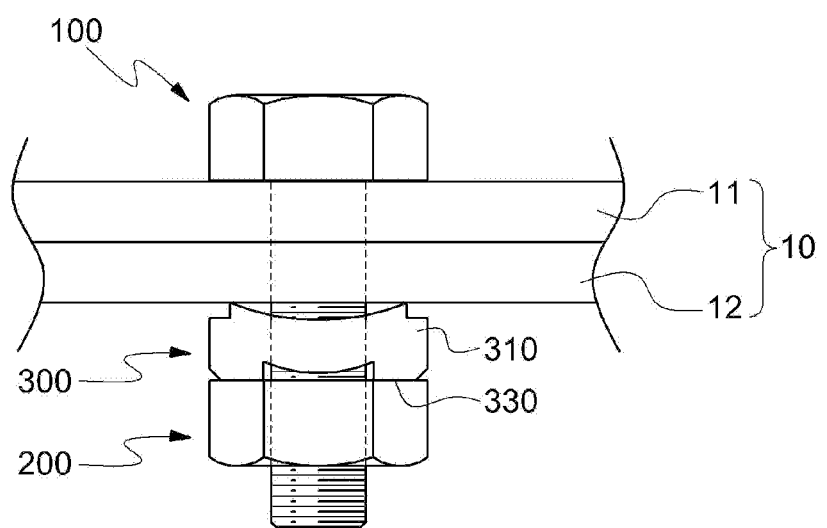
FIG. 5 is an elevation view of a state in which fastening of the nut to the bolt is completed, thereby the lock nut being elastically deformed, the deformation direction of the lock unit of FIG. 5 being opposite to that of FIG. 4.

FIG. 5 is an elevation view of a state in which fastening of the nut to the bolt is completed, thereby the lock nut being elastically deformed, the deformation direction of the lock unit of FIG. 5 being opposite to that of FIG. 4.

In a similar manner to as in FIG. 4, when the nut 200 is completely fastened to the bolt 100 via a pressure-threading operation, a stress along an axial direction of the bolt 100 may be applied to the second protrusions 330, resulting in elastic deformation of the nut body 310 as shown in FIG. 5. According to the present disclosure, by means of the structure of the lock nut 300 having the first and second slots 321 and 331 being extending in different directions from each other, the elastic restoring force of the lock nut 310 may be effectively transferred to the bolt 100 and nut 200.

According to this embodiment, the elastic deformation directions of the lock nut 300 at the top and bottom faces thereof respectively may be different from each other by 90°. Thus, two convex and concave portions resulting from the elastic deformations in a length direction of the bolt 100 are formed on circumferential faces of the bolt 100 and nut 200 respectively. Hence, the friction force between the threads of the bolt 100 and nut 200 may increase, thereby improving the loosing prevention degree to prevent the nut 200 from loosing from the bolt 100.

Moreover, the lock nut 300 may be easily separated/threaded from/onto the bolt 100 using a spanner, etc to have superior workability. The lock nut 300 may be manufactured by applying a simple process to a conventional nut, leading to an advantage of a simple manufacture.

In case where the spring washer is used to prevent the nut from loosing from the bolt, the spring washer may be permanently deformed due to a long time use thereof. Thus, the loosing prevention performance thereof may be deteriorated and the spring washer may not be reusable. However, such drawbacks may be removed using the lock nut 300 of the present disclosure since the lock nut 300 itself is elastically deformed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A lock nut disposed between a bolt and nut to prevent the nut from loosing from the bolt, comprising:
   a nut body having a fastening hole formed therein and having a top face, a bottom face, and a side face;
   a pair of first protrusions formed on either one of the top or bottom face of the nut body, the pair of first protrusions forming a first slot therebetween in a first direction, the first slot allowing an elastic deformation of the nut body; and
   a pair of second protrusions formed on the other top or bottom face of the nut body, the pair of second protrusions forming a second slot therebetween in a second direction different from the first direction, the second slot allowing an elastic deformation of the nut body.

2. The lock nut of claim 1, wherein the first and second directions are at a 90 degree angle to each other.

3. A fastening unit comprising:
   a bolt;
   a nut fastened to the bolt so as to fasten objects; and
   the lock nut of claim 2, disposed between the bolt and nut to prevent the nut from loosing from the bolt.

4. The fastening unit of claim 3, wherein the lock nut is fastened to the bolt while disposed between the objects and the nut, and the first and second protrusions of the lock nut support the objects and the nut respectively.

5. The lock nut of claim 1, wherein a sum of a height of the nut body and a height of the first protrusions and a height of the second protrusions is 3 to 5 times larger than a pitch of the bolt, and the height of the first protrusions and/or the height of the second protrusions are equal to the pitch of the bolt.

6. A fastening unit comprising:
   a bolt;
   a nut fastened to the bolt so as to fasten objects; and
   the lock nut of claim 5, disposed between the bolt and nut to prevent the nut from loosing from the bolt.

7. The fastening unit of claim 6, wherein the lock nut is fastened to the bolt while disposed between the objects and the nut, and the first and second protrusions of the lock nut support the objects and the nut respectively.

8. A fastening unit comprising:
   a bolt;
   a nut fastened to the bolt so as to fasten objects; and
   the lock nut of claim 1, disposed between the bolt and nut to prevent the nut from loosing from the bolt.

9. The fastening unit of claim 8, wherein the lock nut is fastened to the bolt while disposed between the objects and the nut, and the first and second protrusions of the lock nut support the objects and the nut respectively.

* * * * *